(12) United States Patent
Komma et al.

(10) Patent No.: US 10,843,579 B2
(45) Date of Patent: Nov. 24, 2020

(54) CHARGING CONFIGURATION FOR THE INDUCTIVE WIRELESS EMISSION OF ENERGY

(71) Applicant: SIEMENS AKTIENGESELLSCHAFT, Munich (DE)

(72) Inventors: Thomas Komma, Ottobrunn (DE); Monika Poebl, Munich (DE)

(73) Assignee: Siemens Aktiengesellschaft, Munich (DE)

(*) Notice: Subject to any disclaimer, the term of this patent is extended or adjusted under 35 U.S.C. 154(b) by 1413 days.

(21) Appl. No.: 14/499,438

(22) Filed: Sep. 29, 2014

(65) Prior Publication Data

US 2015/0091519 A1    Apr. 2, 2015

(30) Foreign Application Priority Data

Sep. 27, 2013    (DE) .................. 10 2013 219 542

(51) Int. Cl.
*H02J 50/10* (2016.01)
*H02J 50/40* (2016.01)
(Continued)

(52) U.S. Cl.
CPC ............ *B60L 53/12* (2019.02); *B60L 11/182* (2013.01); *B60L 53/36* (2019.02); *H01F 27/24* (2013.01); *H01F 27/2804* (2013.01); *H01F 27/34* (2013.01); *H01F 27/36* (2013.01); *H01F 38/14* (2013.01); *B60L 53/122* (2019.02); *B60L 53/124* (2019.02); *B60L 2270/147* (2013.01); *H02J 50/40* (2016.02); *H02J 50/402* (2020.01);
(Continued)

(58) Field of Classification Search
CPC . H02J 7/025; H02J 50/10; H02J 50/00; B60L 11/182
USPC ........................................... 320/108
See application file for complete search history.

(56) References Cited

U.S. PATENT DOCUMENTS 5,598,327 A * 1/1997 Somerville ......... H01F 17/0006
29/606
6,028,413 A * 2/2000 Brockmann ............ H02J 50/60
320/108
(Continued)

FOREIGN PATENT DOCUMENTS

CN    101179208 A    5/2008
CN    101431259 A    5/2009
(Continued)

*Primary Examiner* — Drew A Dunn
*Assistant Examiner* — Tarikh Kanem Rankine
(74) *Attorney, Agent, or Firm* — Laurence Greenberg; Werner Stemer; Ralph Locher

(57) ABSTRACT

A charging configuration for the inductive wireless energy transfer to a receiver coil of an electrically operated vehicle. A first circularly wound electrically conductive coil extends in a plane and has a first central opening in the center of the first coil. A second circularly wound electrically conductive coil extends in a plane, coplanar with the first coil, and has a second central opening formed in its center. A ferrite core is supported on a shielding sheet with a rectangular base plate together with the coplanar coils. The coils are arranged in a coil holder on the shielding sheet such that a distance of between 15 and 25 mm remains between the shielding sheet and the bottom edge of the coils.

9 Claims, 1 Drawing Sheet

(51) Int. Cl.

| | | |
|---|---|---|
| *H01F 38/14* | (2006.01) | |
| *B60L 53/12* | (2019.01) | |
| *H01F 27/36* | (2006.01) | |
| *B60L 53/36* | (2019.01) | |
| *B60L 11/18* | (2006.01) | |
| *H01F 27/24* | (2006.01) | |
| *H01F 27/28* | (2006.01) | |
| *H01F 27/34* | (2006.01) | |
| *B60L 53/122* | (2019.01) | |
| *B60L 53/124* | (2019.01) | |

(52) U.S. Cl.
CPC ........ *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 6,407,470 B1 | 6/2002 | Seelig | |
| 6,462,509 B1* | 10/2002 | Abe | H01F 38/14 320/108 |
| 8,310,200 B2 | 11/2012 | Matouka et al. | |
| 8,547,058 B2 | 10/2013 | Tabata et al. | |
| 9,276,437 B2 | 3/2016 | Partovi et al. | |
| 2002/0171525 A1* | 11/2002 | Kobayashi | H01F 38/14 336/107 |
| 2003/0020583 A1* | 1/2003 | Hui | H01F 27/365 336/200 |
| 2008/0129246 A1* | 6/2008 | Morita | B60L 5/005 320/108 |
| 2008/0265684 A1* | 10/2008 | Farkas | B60L 11/005 307/104 |
| 2009/0085408 A1* | 4/2009 | Bruhn | H02J 5/005 307/104 |
| 2012/0007437 A1* | 1/2012 | Fells | H04B 5/0037 307/104 |
| 2012/0194127 A1* | 8/2012 | Kobayashi | H02J 5/005 320/108 |
| 2013/0048269 A1* | 2/2013 | Tarayre | E21B 47/122 166/65.1 |
| 2013/0169062 A1 | 7/2013 | Maikawa et al. | |
| 2013/0181667 A1* | 7/2013 | Takeshita | H04B 5/0037 320/108 |
| 2013/0328412 A1 | 12/2013 | Meins et al. | |
| 2014/0055089 A1* | 2/2014 | Ichikawa | H02J 50/12 320/108 |
| 2014/0177197 A1* | 6/2014 | Lampinen | H01F 27/365 361/818 |
| 2014/0191568 A1* | 7/2014 | Partovi | H02J 7/025 307/9.1 |
| 2015/0332839 A1* | 11/2015 | Stock | H01F 3/08 320/108 |

FOREIGN PATENT DOCUMENTS

| | | |
|---|---|---|
| CN | 101867203 A | 10/2010 |
| CN | 101971453 A | 2/2011 |
| CN | 202424250 U | 9/2012 |
| CN | 202749872 U | 2/2013 |
| CN | 103098344 A | 5/2013 |
| DE | 19746919 A1 | 5/1999 |
| EP | 2620961 A1 | 7/2013 |
| KR | 20120016521 A | 2/2012 |
| WO | 2013000593 A1 | 1/2013 |

* cited by examiner

CHARGING CONFIGURATION FOR THE INDUCTIVE WIRELESS EMISSION OF ENERGY

CROSS-REFERENCE TO RELATED APPLICATION

This application claims the priority, under 35 U.S.C. § 119, of German patent application DE 10 2013 219 542.7, filed Sep. 27, 2013; the prior application is herewith incorporated by reference in its entirety.

BACKGROUND OF THE INVENTION

Field of the Invention

The invention relates to a charging configuration for the inductive wireless energy transfer to a receiver coil of an electrically operated vehicle.

In the wireless charging of electric vehicles, windings either of a circular design or of a solenoid design are used. The term "circular design" refers here to a coil in which the windings run spirally in a plane, but the plan outline of the winding may take any annular form (e.g., circular, rectangular). The term "solenoid design" refers to a winding that is in the form of a coil. Given the same coupling, the solenoid design is smaller but causes higher magnetic flux densities, which can lead to considerable heating of metallic bodies in the area of the magnetic field. The circular design has a lower flux density due to its larger surface area, but it is harder to install in a vehicle.

SUMMARY OF THE INVENTION

It is accordingly an object of the invention to provide a charging configuration which overcomes the disadvantages of the heretofore-known devices of this general type and which provide for an improved arrangement for the inductive wireless transfer of energy, which avoids the disadvantages referred to in the introduction.

With the above and other objects in view there is provided, in accordance with the invention, a charging configuration for inductive wireless transfer of energy to a receiving coil of an electrically operated vehicle, the charging configuration comprising:

a first circularly wound electrically conductive coil extending in a given plane and having a first central opening formed in a center of said first coil;

a second circularly wound electrically conductive coil extending in a given plane and having a second central opening formed in a center of said second coil;

said first and second coil having a bottom edge and being disposed in a coplanar relationship;

a ferrite core;

a shielding sheet with a rectangular base plate supporting said ferrite core and said coplanar coils thereon; and a coil holder configured to hold said first and second coils on said shielding sheet to maintain a distance of between 15 and 25 mm between said shielding sheet and said bottom edge of said coils.

In other words, the invention is based on the recognition that a distance between the shielding sheet in the area indicated optimally prevents leakage-flux-induced eddy currents in the shielding sheet in a design that is simultaneously as flat as possible. A distance of between 18 mm and 22 mm, in particular 20 mm, is particularly advantageous. The flat design facilitates the recessing of the charging configuration into the floor, for example at a car-park-type charging station for electric vehicles.

The ferrite core is preferably U-shaped, fashioned as a planar plate running beneath the coils, said plate having a thickness of between 10 and 20 mm, and a first and second leg portion connected to said plate.

It is advantageous if the charging configuration has a base plate arranged beneath the plate of the ferrite core, said base plate having a thickness of between 5 mm and 15 mm, in particular a thickness of between 6 mm and 10 mm. It is particularly advantageous if the thickness of the base plate is 8 mm.

The coils are usefully arranged adjacent to one another. The first and the second coil are preferably of equal size. The planar and thus relatively large-surface-area coils advantageously act as a shield against leakage fields of the ferrite core. Cylindrical coils, by contrast, will not exhibit such a shielding effect in the same position.

The first and/or second coil is preferably formed in a rectangular winding; i.e. as a rectangle with rounded corners. The first and/or second coil preferably has a width of between 200 mm and 300 mm, in particular between 220 mm and 250 mm. The length of the first and/or second coil is preferably between 450 mm and 550 mm, in particular between 490 mm and 520 mm. Alternatively, the first and/or second coil can be fashioned so as to be essentially circular or essentially square.

The first and/or second central opening is preferably fashioned so as to be rectangular with rounded corners. The first and/or second central opening preferably has a length of between 350 mm and 400 mm and a width of between 80 mm and 120 mm.

The thickness of one or both of the leg portions is preferably between 10 mm and 20 mm, in particular between 14 mm and 16 mm. With these thicknesses, it is possible for the plastic-molded, flat, since planar, coils to be arranged such that they lie on the plate of the ferrite core and the leg portions penetrate the central opening of each coil and project up above the several-millimeter-thick plane of the coils. The plate of the ferrite core is also preferably between 10 mm and 20 mm, in particular between 14 mm and 16 mm, thick.

With respect to the efficiency of inductive energy transfer to a secondary-side, i.e. vehicle-side, coil system, it is advantageous if at least one of the leg portions fills at least 70%, in particular at least 80%, of the respective central opening. For example, the length of one or both of the leg portions can be no more than 100 mm less and the width no more than 20 mm, in particular no more than 15 mm, less than the length and width respectively of the respective central opening. Both leg portions preferably fill at least 70%, in particular at least 80%, of the respective central opening.

The first and second coil are usefully connected to a controllable power supply such that the direction of current in the second coil is always opposite to the direction of current in the first coil. The controllable power supply usefully has a communication device for communicating with an electrically operated vehicle. This communication device is designed so as to receive control data for the electric charging from the vehicle and then to adjust the current fed into the coils.

The arrangement concerned is preferably an in-floor charging station for electrically operated vehicles. A secondary-side, i.e. vehicle-side, coil arrangement for receiving the emitted energy functions as a remote station. The vehicle-side coil arrangement is preferably arranged in or on the vehicle floor construction. It usefully comprises a secondary-side ferrite core. This secondary-side ferrite core preferably has a length and a width which are each between 30% and 70% of those of the U-shaped ferrite core on the floor side. This ensures that a lateral displacement—an inexact positioning of the vehicle on the charging device—causes only slight changes in the magnetic coupling and thus the transfer of energy, provided the lateral displacement is not too large.

The charging configuration preferably comprises a base plate having a thickness of between 6 mm and 15 mm, in particular between 8 mm and 10 mm. The width of the base plate is preferably between 700 and 750 mm; the width preferably between 550 mm and 600 mm. The base plate in turn lies preferably on a tub-shaped shielding sheet, usefully made of aluminum. The shielding sheet has a planar base surface and side walls perpendicular thereto. The side walls of the shielding sheet rise to a height corresponding to the structural height of the coils or of the ferrite core, i.e. for example 30 mm. The width and length of the shielding sheet are each preferably 20 mm more than the dimensions of the base plate. By means of the base plate and the coil carriers and the ferrite core, the coils are arranged relative to the shielding sheet such that a distance of preferably between 15 and 25 mm, in particular between 20 mm and 22 mm, is realized between coils and shielding-sheet base surface. This distance advantageously prevents leakage-flux-induced eddy currents in the shielding sheet. At the same time, a flat design, which is suitable for recessing in the floor, is maintained. The tub-like embodiment of the shielding sheet with side walls in turn ensures good shielding and thus good electromagnetic compatibility (EMC).

Other features which are considered as characteristic for the invention are set forth in the appended claims.

Although the invention is illustrated and described herein as embodied in charging configuration for the inductive energy transfer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
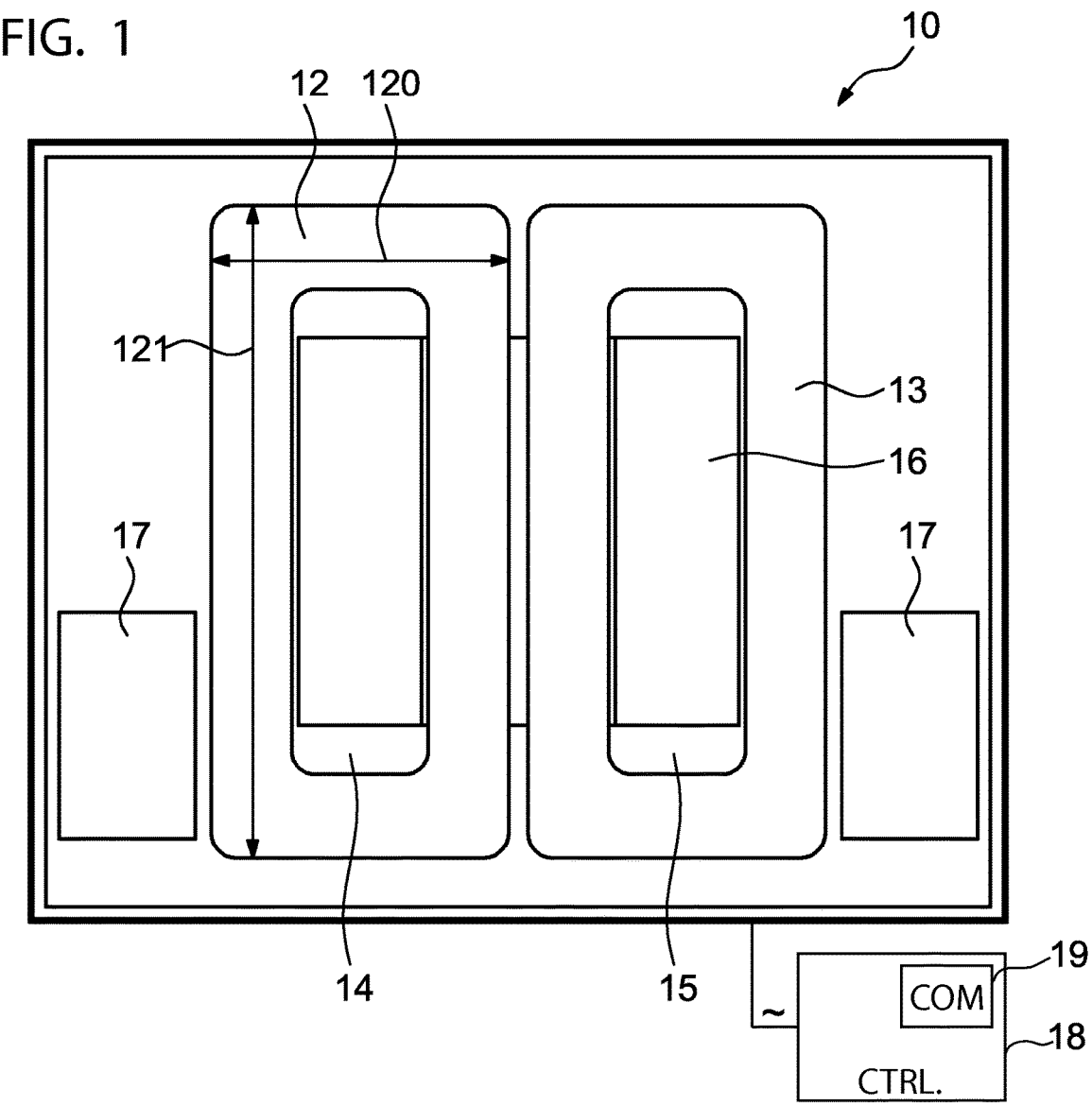
FIG. 1 shows a top view of a floor-side coil configuration.
Figure 2:
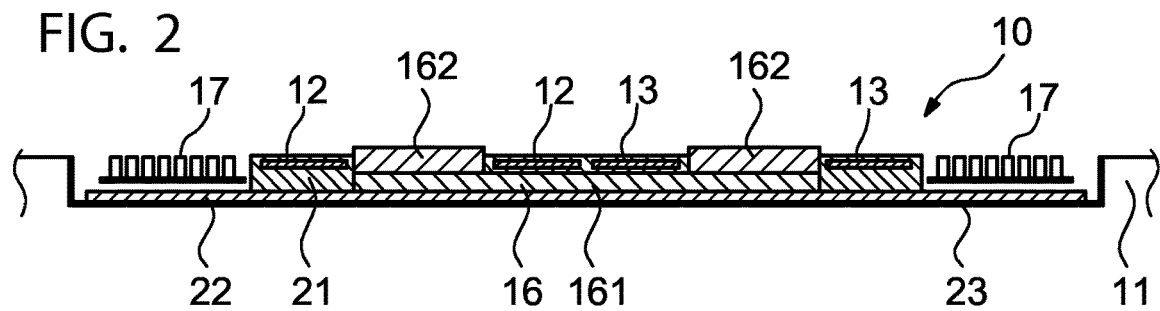
FIG. 2 shows a side view of the floor-side coil configuration.

Referring now to the figures of the drawing in detail, there is shown a floor-side charging device 10 for electric vehicles, which is configured for the inductive emission of energy. The energy is received by a non-illustrated vehicle-side coil. The floor-side charging device 10 is inset into the floor 11. FIG. 1 shows a view from above onto the said components, while FIG. 2 represents a side view of the components.

The floor-side charging device 10 comprises a first coil 12 and a second coil 13 that is coplanar with the first coil 12. The two coils 12, 13 are equal in size and in principle identical in structure. The coils 12, 13 are each wound in a plane (i.e., of circular design), therefore they are not screw thread-like. Both coils 12, 13 are rectangular coils, i.e. the conductor tracks of the coils 12, 13 run in a straight line until close to a corner of the respective coil 12, 13 and then bend with a curve radius of approximately 15 mm through 90°.

In the present example, a width 120 of a coil 12, 13 is 231 mm and a length 121 is 505 mm. Each of the coils 12, 13 has a central opening 14, 15 whose dimensions are 379 mm×105 mm. The two coils 12, 13 lie with their long external sides adjacent to one another at a distance of 14 mm. The coils 12, 13 are inset in a coil carrier 21 made of plastic, as can be seen in FIG. 2.

The coils 12, 13 lie partially on a flat U-shaped ferrite core 16. The ferrite core 16 consists of a rectangular plate 161 and two leg portions 162. The plate 161 is 15 mm thick and crosses beneath the adjacent areas of the two coils 12, 13. The leg portions 162 are in turn rectangular and lie with 3 edges flush on the plate 161. The leg portions 162 are 300 mm long, 95 mm wide and 15 mm high. Together with the height of the plate 161, the leg portions 162 are thus higher from the supporting surface shared with the coils 12, 13 than are the coils 12, 13. The leg portions 162 thus penetrate the central opening 14, 15 fully and project several mm above it. In width, the leg portions 162 fill the central openings 14, 15 almost completely and in length, the leg portions 162 are approximately 80 mm shorter than the central openings 14, 15. The leg portions thus fill a good 70% of the central opening 14, 15. The plate 161 itself and thus the ferrite core 16 as a whole has a width of 340 mm and a length, corresponding to the length of the leg portions 162, of 300 mm.

Capacitor plates 17 are arranged adjacent to the coils 12, 13.

The said components rest on a base plate 22 of 8 mm in thickness, the dimensions of said base plate being 730 mm×580 mm. The base plate 22 in turn lies on a tub-shaped shielding sheet 23 made of aluminum. The shielding sheet 23 has a planar base surface and side walls perpendicular thereto. The side walls of the shielding sheet 23 rise to a height corresponding to the structural height of the coils 12, 13 or of the ferrite core 16, i.e. for example 30 mm. The width and length of the shielding sheet are 750 mm and 600 mm. By means of the base plate 22 and the coil carriers 21 and the ferrite core 16, the coils 12, 13 are arranged relative to the shielding sheet 23 such that a distance of 23 mm is realized between coils 12, 13 and shielding sheet 23.

Both coils 12, 13 are connected to a controllable power supply 18. The controllable power supply 18 provides for control of the coils 12, 13, thereby enabling inductive energy transfer to take place at a suitable frequency. For this purpose, a controlled alternating field is applied to the coils 12, 13 when a charging process is required. For this purpose, the charging device preferably also comprises a communication device 19 which makes it possible to exchange parameters for the charging process, such as maximum power or the like, with the electric vehicle. The controllable power supply 18 is connected to the coils 12, 13 such that the directions of current in the coils 12, 13 are always opposite to one another. It is useful here that the current parameters in the two coils 12, 13 are otherwise the same, i.e. the current strength is always the same, only the direction is the reverse.

The energy emitted by the charging device 10 is received by means of a non-illustrated vehicle-side coil arrangement. The latter has a plate-shaped secondary ferrite core, around which an HF litz wire (profiled litz wire) is wound as a solenoid coil. The secondary ferrite core and thus essentially the vehicle-side coil arrangement is of significantly smaller width and length than the coils 12, 13. In this way, the coupling is advantageously only weakly affected by a lateral offset of the coil arrangements relative to one another. In the present example, the length and width of the secondary ferrite core are 230 mm and 240 mm. Given the dimensions of the primary-side ferrite core, the secondary ferrite core thus covers an area of somewhat more than 50% of the primary ferrite core. Due to the geometry described, a lateral offset of several centimeters advantageously does not alter the energy transfer substantially.

The secondary-side shielding sheet is preferably of approximately the same size as the primary-side shielding sheet, in particular at least 400 mm×400 mm.

The invention claimed is:

1. A charging configuration for inductive wireless transfer of energy to a receiving coil of an electrically operated vehicle, the charging configuration comprising:
   a first circularly wound electrically conductive coil extending in a given plane and having a first central opening formed in a center of said first coil;
   a second circularly wound electrically conductive coil extending in a given plane and having a second central opening formed in a center of said second coil;
   said first and second coil having a bottom edge and being disposed in a coplanar relationship;
   a ferrite core being U-shaped and having a first leg extending into said first central opening of said first coil and a second leg extending into said second central opening of said second coil, said second leg disposed opposite said first leg;
   a shielding sheet with a rectangular base plate supporting said ferrite core and said coplanar coils thereon; and
   a coil holder configured to hold said first and second coils on said shielding sheet to maintain a distance of between 15 and 25 mm between said shielding sheet and said bottom edge of said coils.

2. The charging configuration according to claim 1, wherein the distance is between 18 mm and 22 mm.

3. The charging configuration according to claim 1, wherein said ferrite core is configured as a planar plate running underneath said coils, said plate has a thickness of between 10 and 20 mm, and a first and second leg portion are connected to said plate.

4. The charging configuration according to claim 3, comprising a base plate arranged beneath said plate of said ferrite core, said base plate having a thickness of between 5 mm and 15 mm.

5. The charging configuration according to claim 4, wherein the thickness of said base plate lies between 6 mm and 10 mm.

6. The charging configuration according to claim 1, which comprises a controllable power supply connected to said first and second coils so as to cause a direction of a current in said second coil to be opposite a direction of a current in said first coil.

7. The charging configuration according to claim 1, wherein said first and second coils are equal in size.

8. The charging configuration according to claim 1, wherein said first and second coils are substantially rectangular.

9. A charging system, comprising:
   a charging configuration according to claim 1; and
   a receiver coil of an electrically operated vehicle, said receiver coil having a secondary ferrite core with a length dimension and a width dimension amounting to between 30% and 70% of a length dimension and a width dimension respectively of said plate of said ferrite core.

* * * * *